United States Patent Office 3,515,211
Patented June 2, 1970

3,515,211
CONTROL OF GYPSUM DEPOSITS FROM
BLENDED WATER RICH IN GYPSUM
Paul R. Scott, Houston, and Richard E. Christensen, Midland, Tex., assignors to Shell Oil Company, New York, N.Y., a corporation of Delaware
No Drawing. Filed Aug. 19, 1968, Ser. No. 754,755
Int. Cl. C02b 5/02; E21b 43/00
U.S. Cl. 166—244
4 Claims

ABSTRACT OF THE DISCLOSURE

A method of preventing and removing gypsum deposits from conduit walls caused by precipitation of gypsum resulting from mixing or commingling or blending water gathering systems rich in gypsum thereby causing plugging of conduits such as flow lines, pipelines, tubing strings and the like comprising injecting into the conduit a small amount of an aqueous sodium chloride solution.

This invention is directed to a method of preventing or removing gypsum deposits from conduit walls caused by commingling, mixing or blending water recovered from underground source wells in which the water produced comes from at least two different sections of an aquifer and the water is mixed or commingled together in the well bore from which it is recovered for pipeline transportation to waterflood sites or the like.

BACKGROUND OF THE INVENTION

It is well known in the art that pipeline transportation of supersaturated gypsum solutions is troublesome because of the tendency of the gypsum to deposit on the pipeline walls causing plugging of the line which is extremely difficult to remove.

Mixed or commingled or blended well water produced from at least two different sections of an aquifer and injected into pipelines for transportation to desired sites such as to oil production centers for use as waterfloods are extremely difficult to handle because of the water mixtures or blends tending to deposit gypsum on the flowlines such as tubing strings and pipelines causing plugging of the lines which is extremely difficult to remove.

Water mixtures or blends thus produced generally contain crystals of solid gypsum which form in the gathering or blending process and these crystals act as seed materials for gypsum deposition on flowlines, e.g., pipe walls. Generally, these crystals become trapped and become cemented to the rough places of the flowline and the crystals grow into large ones which plug the line. Water from a single source would not do this. However, blending source water from different wells does cause gypsum deposition as described. The reason for this appears to be that the mixing of two or more waters results in a supersaturated water with severe scaling tendencies. In producing wells, the most common cause of this trouble is the simultaneous production of fluid from two or more strata. Surface mixing for disposal or injection can also generate a scale-forming situation.

Various methods of preventing and removal of gypsum deposits caused by water mixing or blending or commingling have been proposed in the art but these have been found to be both costly and ineffective. Thus, mechanical means such as scraper or explosives such as string shot have been used but such methods are time consuming, generally ineffective and dangerous. Also, the use of acids such as HCl have been proposed but present a corrosion and handling problem. Another method for removing gypsum deposits is by modification of the gypsum deposits by chemical means such as by use of conversion agents which convert the gypsum to calcite ($CaCO_3$) which is then removed by acidization.

The problem of preventing and removal of gypsum deposits from supersaturated gypsum (calcium sulfate) water solutions containing also a variety of electrolytes is an extremely important one particularly in areas where any kind of water is at a premium and also because of its increasing importance for use in various commercial applications such as in water-flooding operations for oil recovery where the water need not be pure as for use as a driving fluid or for other industrial purposes.

An object of the present invention is to prevent gypsum deposition or precipitation caused by mixing, commingling or blending water from different sources each containing solubilized or stably dispersed gypsum.

Another object of the present invention is to remove gypsum deposits caused by blending, mixing or commingling water from different sources each of which alone is not prone to such deposition.

Still another object of the present invention is the prevention and removal of gypsum deposits on pipeline walls while transporting blended or commingled water supersaturated with gypsum.

Still another object of the present invention is to render blended or commingled water supersaturated with gypsum for use as flood water in fluid recovery from underground formations non-plugging to contacting surfaces and flowlines such as encountered in the tubing string, well borehole and rock formation.

Other objects of the invention will be apparent from the following description.

SUMMARY OF THE INVENTION

The above and other objects of the present invention are attained by addition to, admixing with or injecting into blended or commingled water enriched with gypsum which because of this tends to deposit or precipitate gypsum out of solution and onto contacting surfaces, a small amount of aqueous solution of sodium chloride to increase the sodium chloride content from less than 1% to about 5% by weight of sodium chloride in the final solution. Also, the present invention is directed to removing gypsum deposits which have caused plugging of formations and flowlines, e.g., conduits, due to deposition of said gypsum from blended water as defined by adding thereto a small amount of dilute sodium chloride solution.

By gypsum enriched blend water is meant water mixtures or blends resulting in gypsum formation which can render the water mixture or water blend supersaturated with gypsum or resulting in water mixtures or blends containing crystals of solid gypsum which act as seed material for gypsum deposition. The blended or commingled water may also contain from 0 to 150,000 p.p.m. of electrolytes.

The aqueous sodium chloride solution which prevents or removes gypsum deposits caused by blended or commingled water can be brine, sea water or fresh water containing 1% to 5% of sodium chloride. Thus by the process of the present invention addition of a brine solution to blended or mixed or commingled water being transported through a pipeline or used as waterflood for use in fluid recovery from underground formations will prevent gypsum deposition or remove gypsum deposits rendering such water blends free flowing under conditions as noted.

Optionally wetting or surfactive agents capable of water-wetting contacting surfaces can be added in a water-oil system to the blended water, or to the sodium chloride solution or injected as an aqueous slug before, after or simultaneously with the sodium chloride solution.

PREFERRED EMBODIMENT OF THE INVENTION

To illustrate the effectiveness of the process of the present invention to remove and/or prevent gypsum deposits from blended or commingled water, the following examples are noted.

Example I

A water blend containing 4000 p.p.m. of $CaSO_4$ and 3000 p.p.m. of NaCl flowing through a 10-inch pipeline caused heavy gypsum deposits greatly restricting the flow of the water blend. On injection of about 1000 p.p.m. of additional NaCl in a water solution, 70–80% of the deposits were removed and normal flow was achieved.

Example II

A water blend from the West Texas Water Supply System containing about 3000 p.p.m. of $CaSO_4$ and 2500 p.p.m. of NaCl transported through a 10-inch pipeline resulted in heavy gypsum build up in the pipe walls restricting water flow. Injection of 3000 p.p.m. (0.3%) of additional NaCl solution into the line dissolved the deposit and free flow was established.

To illustrate the effectiveness of the process of the present invention in recovering oil from underground formations using as the water-flood aqueous composition of the present invention.

The West Texas Wells shown in Table 1 were treated with blended water supersaturated with gypsum and the same water blends to which a brine solution was added and the results are shown below.

TABLE 1

| Well | Amount of 10#/gal. brine added to supersaturated gypsum solution (bbls.) | Production (B.P.D.) | | | |
|---|---|---|---|---|---|
| | | Before | | After | |
| | | Oil | Water | Oil | Water |
| Witcher A-8 | 410 | 18 | 150 | 70 | 440 |
| Witcher A-5 | 270 | 70 | 45 | 80 | 65 |
| Witcher A-4 | 419 | 20 | 165 | 30 | 400 |

The treating procedure on these three wells was as follows:

(1) Lowering tubing to near bottom of hole, if necessary;
(2) Pumping 30 gallons Tretolite SW 806 W surfactant to make the reservoir rock, water-wet;
(3) Pumping two to three transport truckloads (135 bbls.) of 10#/gal. brine water down the tubing and, if possible, circulate up the casing-tubing annulus for about 3 hours;
(4) Shutting in the well over night; and
(5) Placing the well on production.

It is apparent from the table that the total production has been increased for each well treated. Also, water samples indicate about one-half to one pound of gypsum was dissolved per barrel of water used in each of these three wells.

It is understood that various changes in the details described to explain the invention can be made by persons skilled in the art within the scope of the invention as expressed in the appended claims.

We claim as our invention:

1. A method of preventing gypsum deposition on contacting surfaces caused by blending at least two different waters each of which contains an electrolyte and each of which contains dissolved gypsum but on blending results in a supersaturated gypsum solution resulting in gypsum deposition on said surfaces comprising the steps of:
    (a) blending at least two of said waters each containing an electrolyte and dissolved gypsum; and
    (b) admixing with the blend of step (a) a small amount of sodium chloride solution sufficient to provide a concentration of from about 1% to 5% by weight of sodium chloride in the final solution so as to prevent gypsum deposits on contacting surfaces resulting from blended mixtures of step (a).

2. The method of claim 1 wherein the sodium chloride solution is a brine solution.

3. The method of claim 2 wherein the internal contacting surface is the surface of conduit flowlines.

4. A method of transporting through a pipeline a mixture of at least two waters each of which contains an electrolyte and dissolved gypsum in an amount sufficient to form a supersaturated gypsum solution without plugging the line with gypsum deposits comprising the steps of:
    (a) flowing a mixture of at least two waters each of which contains dissolved electrolyte and gypsum which due to blending tends to precipitate and deposit on the pipeline walls gypsum; and
    (b) injecting into the water mixture a small amount of sodium chloride solution sufficient to prevent gypsum deposition on the pipeline wall so that the final solution contains from about 1% to about 5% by weight of sodium chloride.

References Cited

UNITED STATES PATENTS

| 239,417 | 3/1881 | Alfieri | 252—175 X |
| 1,405,783 | 2/1922 | Holle | 252—175 X |
| 2,777,818 | 1/1957 | Gambill | 252—8.55 |
| 2,947,690 | 8/1960 | Axelrad | 210—57 |
| 3,240,627 | 3/1966 | White | 252—8.55 |
| 3,258,071 | 6/1966 | Shen et al. | 166—275 |

FOREIGN PATENTS 148,547   1922   Great Britain.

OTHER REFERENCES

Cozzens, F.R. Brine Baths for Dirty Wells. In Oil Weekly, 117 (7), Apr. 16, 1945, pp. 54 and 56.

DAVID H. BROWN, Primary Examiner

I. A. CALVERT, Assistant Examiner

U.S. Cl. X.R.

210—57